(12) United States Patent
Tan (10) Patent No.: US 7,702,898 B2
(45) Date of Patent: Apr. 20, 2010

(54) METHOD FOR AUTHENTICATING AND VERIFYING SMS COMMUNICATIONS

(75) Inventor: Clarence Nyap Tan, Robina (AU)

(73) Assignee: Wireless Applications Pty Ltd., Robina (AU)

( * ) Notice: Subject to any disclaimer, the term of this patent is extended or adjusted under 35 U.S.C. 154(b) by 1285 days.

(21) Appl. No.: 10/513,572

(22) PCT Filed: May 7, 2003

(86) PCT No.: PCT/AU03/00535

§ 371 (c)(1),
(2), (4) Date: Aug. 12, 2005

(87) PCT Pub. No.: WO03/096615

PCT Pub. Date: Nov. 20, 2003

(65) Prior Publication Data

US 2006/0098678 A1    May 11, 2006

(30) Foreign Application Priority Data

May 7, 2002   (AU) .................................. PS2170

(51) Int. Cl.
*H04L 29/06* (2006.01)
*H04L 9/32* (2006.01)
*H04K 1/00* (2006.01)
*H04L 9/28* (2006.01)
*G06F 15/16* (2006.01)

(52) U.S. Cl. ............... 713/150; 713/160; 713/165; 713/168; 380/247; 380/255; 380/270; 380/28; 709/227

(58) Field of Classification Search ........... 713/150, 713/160, 165, 168; 380/247, 255, 270, 28
See application file for complete search history.

(56) References Cited

U.S. PATENT DOCUMENTS

| | | | | |
|---|---|---|---|---|
| 6,049,613 | A * | 4/2000 | Jakobsson | 380/47 |
| 6,754,484 | B1 * | 6/2004 | Hiltunen et al. | 455/412.1 |
| 6,912,285 | B2 * | 6/2005 | Jevans | 380/284 |
| 6,986,036 | B2 * | 1/2006 | Wang et al. | 713/153 |
| 2001/0056546 | A1 * | 12/2001 | Ogilvie | 713/200 |
| 2002/0034300 | A1 * | 3/2002 | Thuvesholmen et al. | 380/256 |
| 2002/0078351 | A1 * | 6/2002 | Garib | 713/168 |

(Continued)

FOREIGN PATENT DOCUMENTS

EP   0 898 397 A2   2/1999

*Primary Examiner*—William R Korzuch
*Assistant Examiner*—Aravind K Moorthy
(74) *Attorney, Agent, or Firm*—Lambert & Associates; Adam J. Bruno; Gary E. Lambert (57) ABSTRACT

A method for operating a first computational device to facilitate the secure transfer of a message between the first computation device and a second computational device is described. The method comprises operating the first computational device according to the following steps: forming an encrypted message from the message on the basis of a key derived from one or more codes associated with the second computational device; transmitting the encrypted message to the second computational device; purging the message and the encrypted message from the first computational device; receiving the encrypted message and said one or more codes from the second computational device; upon decrypting the message on the basis of the one or more codes transmitting the decrypted message to the second computational device.

20 Claims, 10 Drawing Sheets

U.S. PATENT DOCUMENTS

2002/0184487 A1* 12/2002 Badamo et al. ............. 713/153
2003/0028620 A1* 2/2003 Woelfel et al. ............. 709/219
2003/0142364 A1* 7/2003 Goldstone ................... 358/402
2003/0204726 A1* 10/2003 Kefford et al. ............. 713/171

* cited by examiner

METHOD FOR AUTHENTICATING AND VERIFYING SMS COMMUNICATIONS

FIELD OF THE INVENTION

The present invention is concerned with a method for facilitating secure transactions over a wireless medium. In particular the invention is concerned with a method for authenticating and verifying text messages sent to wireless devices such as cell phones.

BACKGROUND TO THE INVENTION

Over the past decade the use and penetration of computational devices such as mobile or cellular phones and related technology, such as PDA's (personal digital assistants) has increased dramatically. Apart from providing voice communications, modem cell phones support SMS (short message services) by which a message of up to 160 characters of text may be entered, by means of a sender phone's keypad, or by a PC keyboard via the Internet, and transmitted over a telephone network for display on a receiver phone's display screen.

Various services associated with SMS have developed. According to one of these services text messages, with an associated addressee's cell phone number, may be sent from a content sender such as an Internet connected personal computer to an SMS web-server. The SMS web-server provides a gateway to a telephone network in order to deliver the message to the addressed cell phone where it is displayed in standard SMS format.

Although there have been no reported cases of successful interception of SMS messages via the SMS protocol under the GSM specifications, the use of SMS for transmitting sensitive information, such as financial transaction data, has been limited due to a perception that SMS transactions are potentially insecure. There have been solutions proposed for secure mobile banking that involve the use of a SIM toolkit whereby templates and security procedures are handled by modifying a cell phone user's SIM card. However, permission and agreement must be obtained from each carrier's SIM card provider. In order for a user to make use of a particular financial institution's SMS banking facility the user must purchase a SIM card from a provider with whom the financial institution has an agreement.

SUMMARY OF THE INVENTION

According to a first aspect of the present invention there is provided a method for operating a first computational means to facilitate the secure transfer of a message between the first computational means and a second computational means, the method comprising operating the first computational means according to the following steps:
 forming an encrypted message from the message on the basis of a key derived from one or more codes associated with the second computational device;
 transmitting the encrypted message to the second computational device;
 purging the message and the encrypted message from the first computational device;
 receiving the encrypted message and said one or more codes from the second computational device;
 upon decrypting the message on the basis of the one or more codes transmitting the decrypted message to the second computational device.

In a preferred embodiment the first computational means comprises a computer network server in communication with a cellular telephone network. The computer network in question may be the Internet. The message may originate at a content sender in the form of a personal computer connected to the first computational device by means of a network such as the internet.

Alternatively, the first computational means may comprise a cellular phone.

It is envisaged that the second computational device will usually be a cellular phone and that the message will be delivered to the cellular phone in SMS format.

The step of forming an encrypted message will normally involve forming the key on the basis of the cellular phone's phone number and a personal identification number to be used by the owner of the cellular phone.

In a preferred embodiment the step of transmitting the encrypted message to the cellular phone includes transmitting a message identifier that is associated with the encrypted message.

Preferably the cellular phone transmits both the encrypted message and the message identifier back to the first computational means.

The method may further include the step of the computational means generating an error code if the message identifier is not received back from the cellular phone within a predetermined time period.

In a preferred embodiment the one or more codes comprise a PIN and CLI associated with the cellular phone.

The first computational means may check the PIN and CLI for consistency in length and/or field type.

Preferably the method further includes the step of sending an error status message to the content sender advising of any error conditions.

Where two-way authentication between the first computational device and the second computational device is required, the method may include a step of encrypting the message with a private key of the first computational means and a public key of the second computational means The method may be used to conduct financial transactions between a financial institution and a client of said institution where the client operates the cellular phone and the institution operates the computer network server.

According to a further aspect of the invention there is provided a computer software product, provided upon a computer readable medium, for execution by a computational device, the computer readable medium including instructions for:
 forming an encrypted message from a message on the basis of a key;
 transmitting the encrypted message to a second computational device;
 purging the message and the encrypted message;
 receiving the encrypted message and said one or more codes from the second computational device;
 upon decrypting the message on the basis of the one or more codes transmitting the decrypted message to the second computational device.

Other preferred features of the invention will be apparent from the following detailed description which will make reference to a number of figures as follows.

DETAILED DESCRIPTION OF PREFERRED EMBODIMENT

Figure 1:
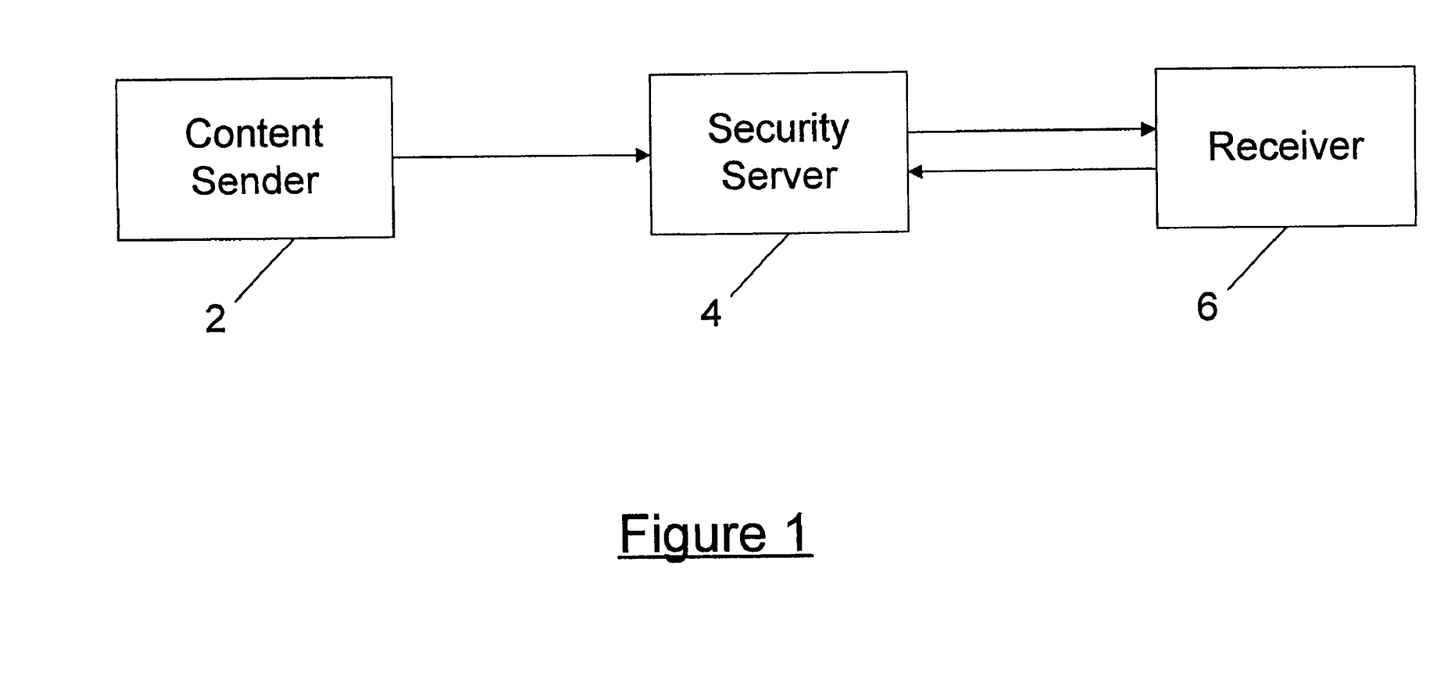
FIG. 1 is a block diagram of the entities involved during the performance of a secure messaging method according to a preferred embodiment of the invention.

FIG. 1 illustrates the entities involved in a secure SMS transaction according to a preferred embodiment of the present invention. Content sender 2 will typically be client workstation, for example a personal computer, at which a message to be sent to receiver 6 originates. Security server 4 is a web-server in communication with the content sender. The security server executes a software product that contains instructions for executing a method according to an embodiment of the present invention. The security server is able to establish communications with receiver 6 which is typically an SMS capable cell phone. The communication between content sender 2 and security server 4 may be by means of an SSL (secure socket layer) Internet connection, for example. Security server 4 provides a gateway between the content sender and a cell phone telephone network to which receiver 6 is a subscriber. It will be realised that the functionality of security server 4 may be integrated into content sender 2. Furthermore, the content sender 2 could comprise a cell phone. Accordingly, in other embodiments the present invention may be used to facilitate secure messaging directly between two computational devices comprising cell phones.

Figure 3:
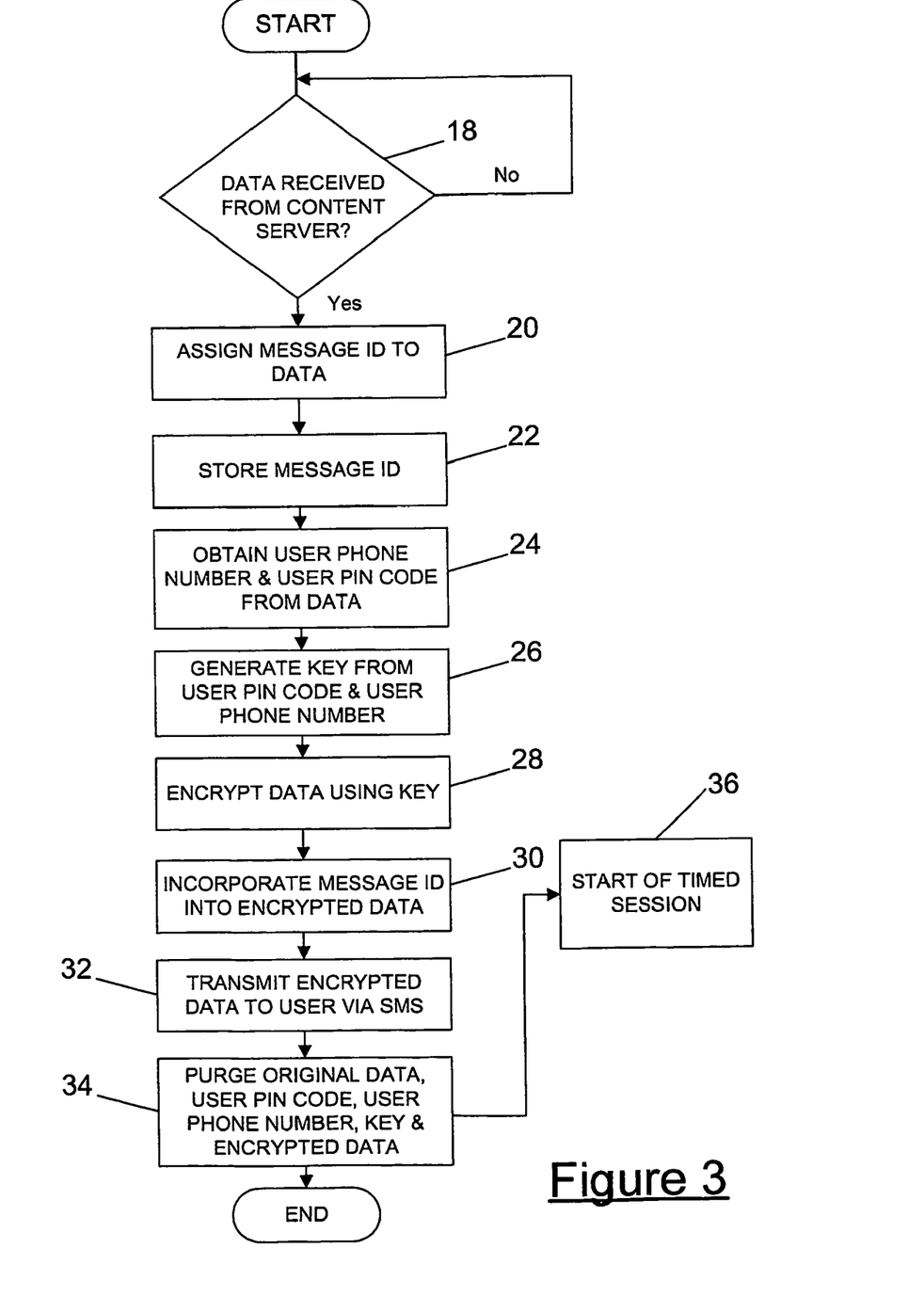
FIG. 3 is a flowchart of a method of operation of a secure server handling messages outgoing to receiver according to a preferred embodiment of the invention.
Figure 4:
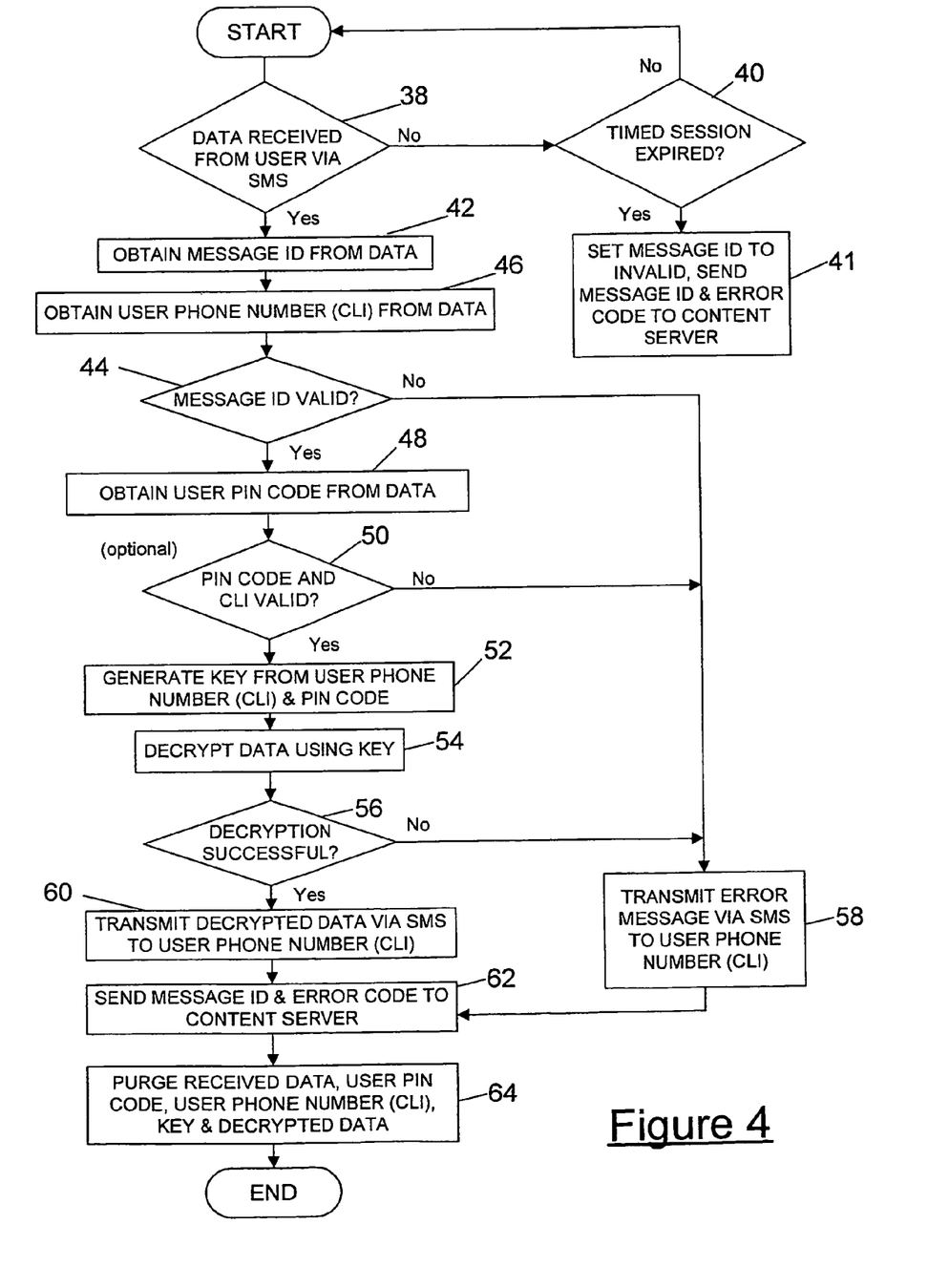
FIG. 4 is a flowchart of a method of operation of a secure server handling messages incoming from a receiver according to a preferred embodiment of the invention.

A secure communication method according to a preferred embodiment of the present invention will now be explained with reference to FIGS. 2, 3 and 4. Initially, at box 18 of FIG. 3, security server 4 awaits an incoming data package 8 from content sender 2. Data packet 8 contains a message for receiver 6 along with the receiver's PIN number and telephone number or line identifier (CLI). By prearrangement the PIN number is known to both content sender 2 and receiver 6 at the time that the owner of receiver 6 subscribes to the secure transaction service. At the time of subscribing the phone number of receiver 6 is also provided to content sender 2.

At box 20 (FIG. 3) security server 4 assigns a unique message identifier (MID) to the received data packet. At box 22 the message identifier is stored in memory of security server 4. At box 24 the receiver's phone number (CLI) and PIN are retrieved from data package 8.

At box 26 the security server generates an encryption key from the PIN and CLI according to a standard algorithm. If two-way authentication is required a PKI (public key infrastructure) technique may be employed by which the message is encrypted with the private key of the sender and the public key of the receiver.

Several cryptography techniques are known and are described in Applied Cryptography, Second Edition: protocols, algorithms, and source code in C, ISBN 0-471-11709-9, John Wiley & Sons, USA, 1996 by Bruce Scheiner.

At box 28 the message is encrypted using the encryption key to produce an encrypted message Enc{Msg}. At box 30 the encrypted message and unique message identifier, MID, are packaged to form a data package 10. Data package 10 also includes a text message, which is displayed on receiver 6 as a request to enter the user PIN. Data package 10 is transmitted to receiver 6 at box 32. The security server then, at box 34, purges itself of information from data packet 8, including the message, PIN code, phone number, key and encrypted data. At the same time a clock is started that records the time at which a message with the unique message identifier allocated in box 22 was transmitted. The MID is stored on server 4, along with a timeout value for future use as will be explained shortly.

It will be noted that because no copy of the message, either plain or encrypted, is stored on secure server 4 after the message is dispatched to the receiver 6, the likelihood of a hacker successfully obtaining the message from the secure server is greatly reduced. Most financial institutions require that no sensitive information is saved on the server. The message is encrypted and sent to the receiver so that only the receiver who knows the PIN and has the right cell phone SIM can retrieve the clear message. If somebody without the PIN picks up the receivers cell phone, he/she will only see a gibberish encrypted message. The receiver needs to send the encrypted message back with his/her pin from his/her SIM, so that the message can be successfully decrypted.

Upon receiver 6 receiving data package 10 a text message requesting a PIN be entered is displayed. The user of receiver 6 then replies entering the PIN. Data package 12 is then transmitted back to security server 4. Data package 12 contains the receiver's phone number (CLI), PIN and the information which was in data package 10 being the message identifier (MID) and the encrypted message Enc{Msg}.

At box 38 (FIG. 4) security server 4 receives data package 12 from receiver 6.

The security server obtains the message identifier MID and CLI from the data package and checks to see if the timeout value for that message identifier has been exceeded at box 40. If the timer has indeed timed out then control diverts to box 41 where an error message is transmitted to the content server. The message ID and user phone number are extracted from the incoming data package at boxes 42 and 46.

At box 44 the message ID is checked to see if it is valid. At box 48 the user's PIN code is extracted from the incoming data package. At box 50 a check is undertaken to ensure that the PIN and receiver phone number (CLI) are correct. At box 52 a key is generated from the receivers phone number and PIN. At box 54 the key is used to decrypt the encrypted message Enc{Msg}. At box 60 the decrypted message, item 14 of FIG. 2, is sent to receiver 6 using the receiver's phone number. At box 62 a status message along with the message identifier (MID) 16, (FIG. 2) is sent to the content sender 2. The status message comprises an error code that reflects whether or not the authentication and verification process terminated successfully. The error code may indicate if the message identifier received back from receiver 6 was invalid, if the PIN and/or CLI from the receiver were invalid or if the decryption of Enc{Msg} from the receiver was unsuccessful.

If no errors were encountered then the error message will indicate that the procedure was successful.

At box 64 the security server purges from its memory the user PIN, receiver phone number, encryption key and the decrypted message.

Figure 2:
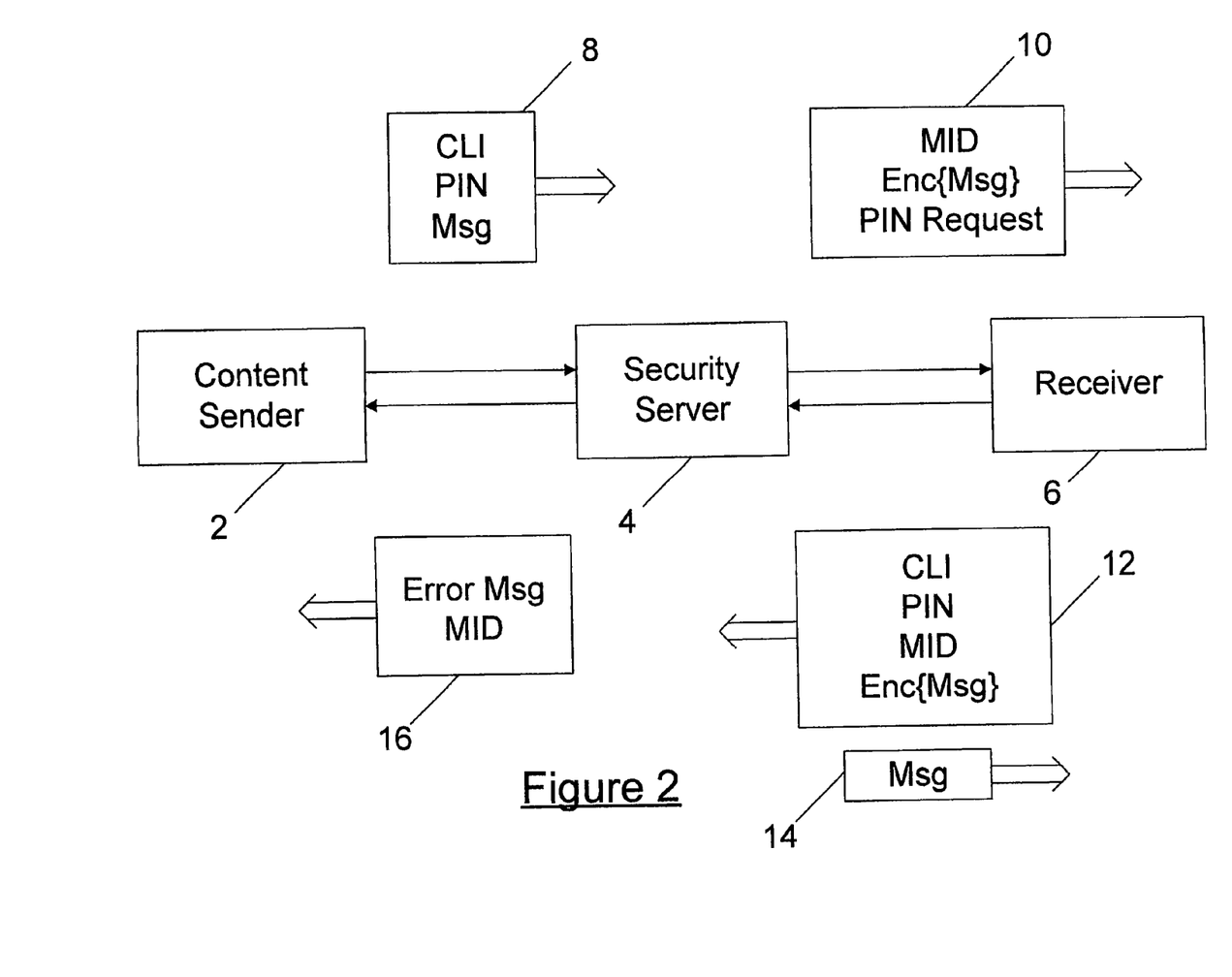
FIG. 2 includes the entities of FIG. 1 and additionally shows messages that are transferred between the depicted entities during the secure messaging method.
Figure 5:
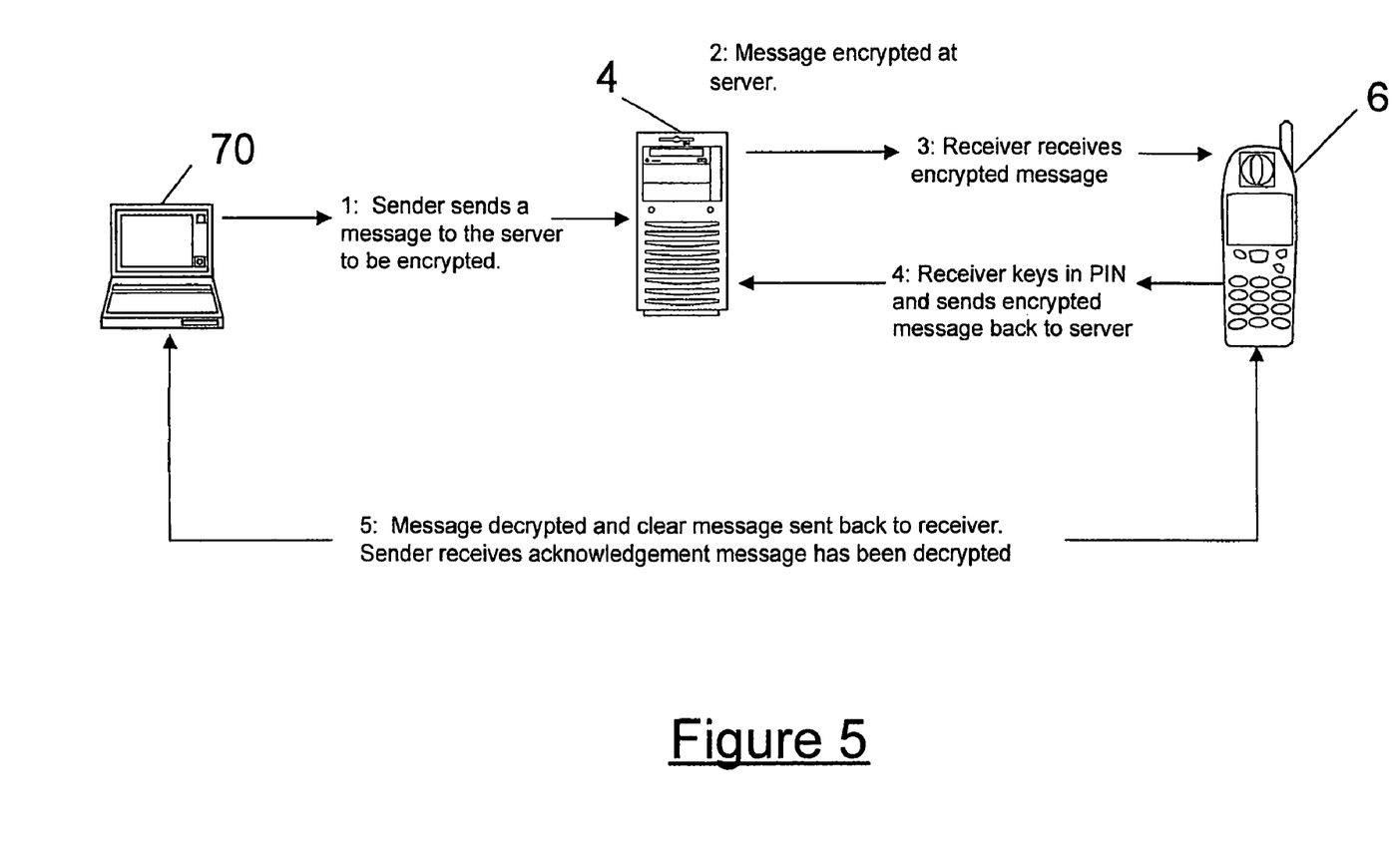
FIG. 5 schematically depicts an application of a secure messaging method according to an embodiment of the present invention.

A software product executable by security server 4 for implementation of the above method will preferably include instructions for forming an encrypted message from the message from sender 2 on the basis of a key;

transmitting the encrypted message to a second computational device, such as receiver 6;

purging the message and the encrypted message;

receiving the encrypted message and one or more codes from the second computational device; and upon decrypting the message on the basis of the one or more codes transmitting the decrypted message to the second computational device An example of the use of the authentication and verification method described with reference to FIGS. 1-4 will now be explained with reference to FIG. 5 wherein the same indicia as employed in FIG. 2 are used to identify similar items. A stockbroker 70, on completion of a stock transaction deal for a customer having a receiver 6 (i.e. a cell phone), generates a message by means of content sender (personal computer) 2. The message is encrypted and sent to the customer's cell phone 6. The customer enters a PIN into receiver 6 which, along with the encrypted message and the customer's phone number (CLI) is sent back to secure server 4. This is normally done by using the "Reply" function that is available on most cell phones. The secure server receives the response from the receiver 6 and decrypts the message using the CLI and PIN to generate the decryption key.

The decrypted message is then sent back to the receiver and a status message is sent to the content sender 2 either confirming that the message was successfully delivered or providing an error code if message delivery failed.

Figure 6:
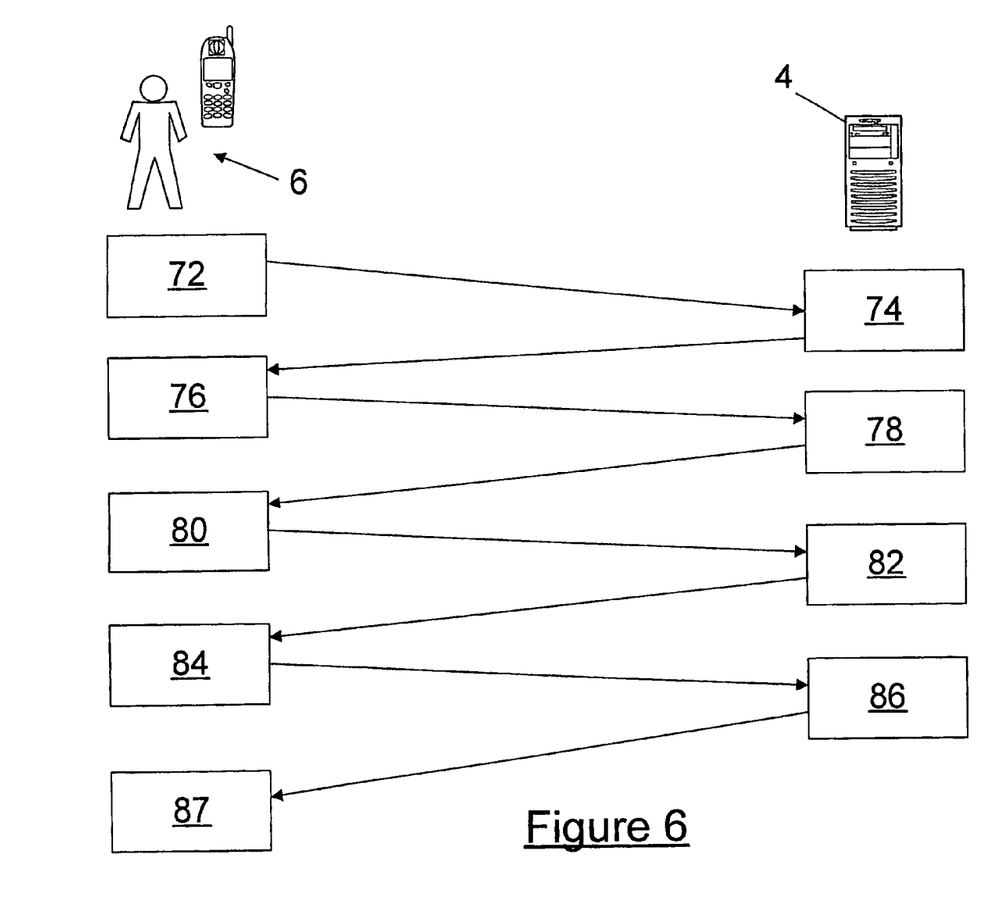
FIG. 6 depicts the steps involved in a fund transfer operation according to an embodiment of the present invention.

FIG. 6 is a flowchart of the interaction between a cell phone user 6 and the web-server 4 of a financial institution. Initially, at box 72 the cell phone user initiates a funds transfer by sending an SMS message, optionally with username, to secure web-server 4.

The web-server verifies the user using the cell phone's CLI and the username that is in the message. Web-server 4 responds with an SMS menu having a number of options. For example the options may be to make a balance inquiry or to make a funds transfer or a to make a payment. At box 76 the user receives the menu message and replies by selecting the desired option. For example user 6 may decide to make a funds transfer.

At box 78 the secure web-server 4 verifies the user using the CLI and sends an appropriate response depending on which menu item the user selected at box 76. For example the secure web-server may send a request for user 6 to confirm on which of its accounts the funds transfer is to be performed. At box 80 the user enters any data necessary for the transfer to continue into cell phone 6. The data may be the amount to be transferred and identification of the account from which the amount is to be transferred and the destination account. At box 82 secure web-server 4 once again verifies the user on the basis of the cell phone's CLI. An encrypted SMS message is sent confirming that the funds transfer is ready to proceed. Also sent is a non-encrypted message requesting the user to enter a PIN. At box 84 the user receives the request for PIN and returns the PIN and the encrypted message. At box 86 the server verifies the user using the cell phone's CLI, PIN and receipt of the encrypted message. Once verified, confirmation of the requested transaction is sent back to user 6 and displayed at box 87 on the user's cell phone. For example a message such as "You have transferred <amount> from <Account No. 1> to <Account No. 2>." may be sent.

Figure 7:
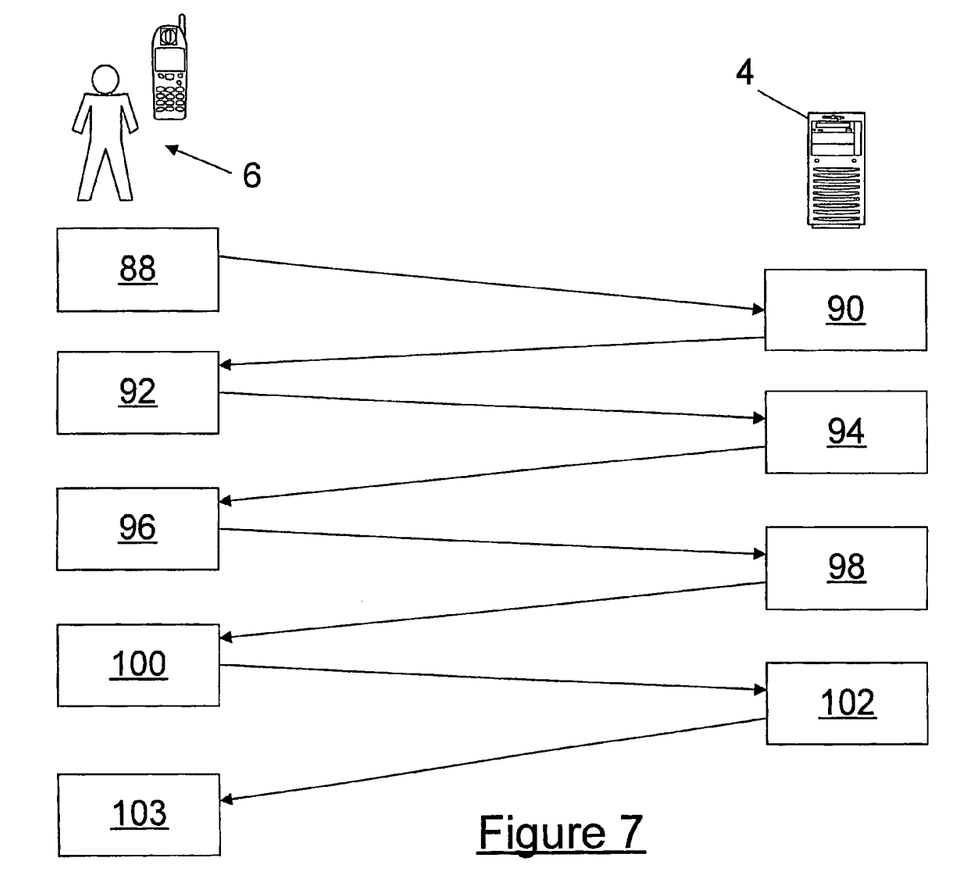
FIG. 7 depicts the steps involved in a B-Pay operation according to an embodiment of the present invention.

FIG. 7 is a flowchart of the exchange of information between the user of a cell phone 6 and the secure web-server 4 of a financial institution in order to make a B-Pay transaction. Initially, at box 88 the cell phone user initiates a B-Pay transaction by sending an appropriate SMS message, with username, to secure web-server 4. At box 90 the web-server verifies the user by means of the cell phone's CLI and the username that is in the message. Web-server 4 responds with an SMS menu having a number of options including a B-Pay transaction option and, for example, a balance option and a fund transfer option. At box 92 the user receives the menu message and replies by selecting the B-Pay transaction option. At box 94 secure web-server 4 verifies the user using the CLI and sends an appropriate response for example a query as to which account the B-Pay transaction amount should come from.

At box 96 user 6 enters the account to be debited for the transaction and the B-Pay payee's code. At box 98 secure web-server 4 once again verifies the user on the basis of the cell phone's CLI. An encrypted SMS message is sent to the user's cell-phone confirming that the funds transfer is ready to proceed and requesting the user to enter a PIN in the event that a transaction request has been confirmed. At box 100 the user receives the request for PIN and enters the pin number into cell phone 6 and transmits it web-server 4. A message including the PIN number and the encrypted message is returned to web-server 4.

At box 102 the server verifies the user using the cell phone's CLI, PIN and the receipt of the encrypted message. Once verified confirmation that the requested transaction is completed is sent back to the cell phone. At box 103 the cell phone displays the confirmation message.

Figure 8:
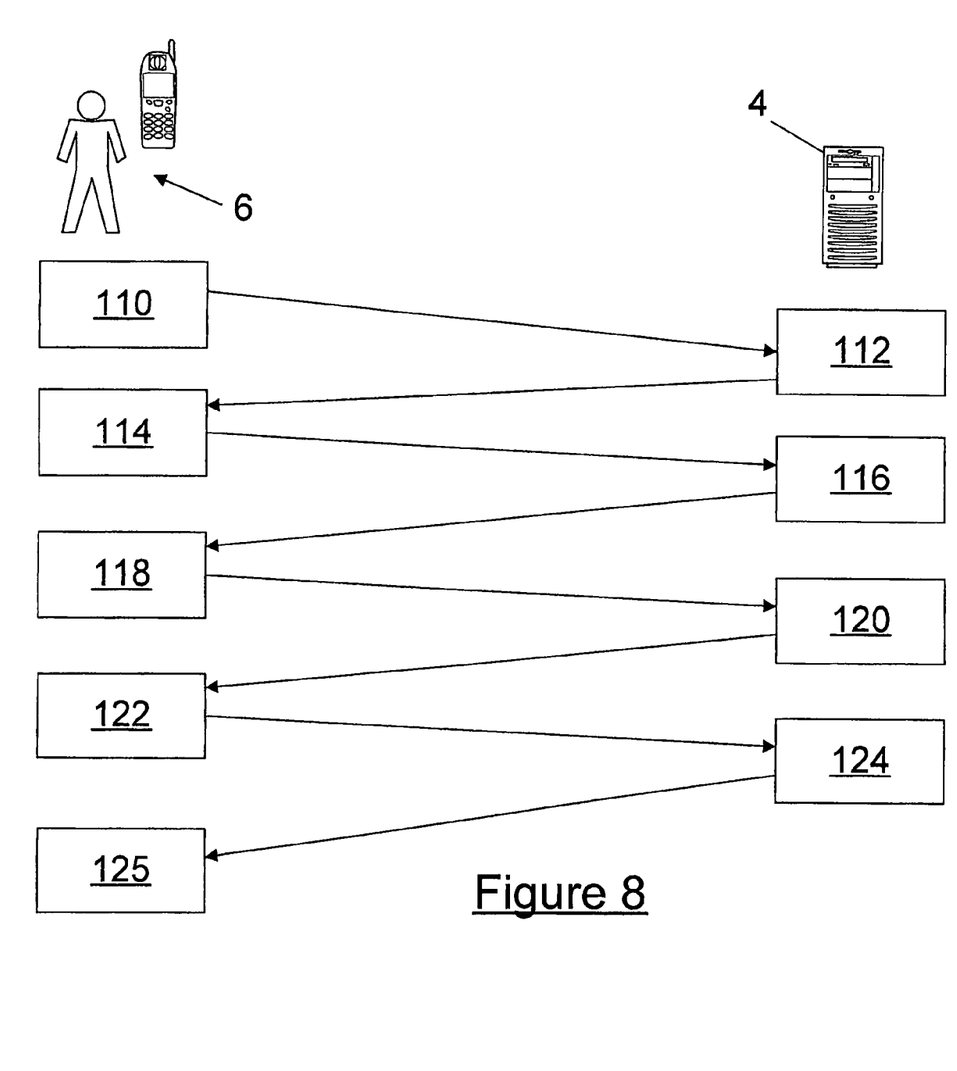
FIG. 8 depicts the steps involved in a balance inquiry operation according to an embodiment of the present invention.

FIG. 8 is a flowchart of the exchange of information between the user of a cell phone 6 and the secure web-server 4 of a financial institution in order to make a balance inquiry. Initially, at box 110 the cell phone user initiates a balance inquiry by sending an appropriate SMS message, with username, to secure web-server 4. At box 112 the web-server verifies the user by means of the cell phone's CLI and the username that is in the message. Web-server 4 responds with an SMS menu having a number of options including a balance inquiry option. Other options on the menu might be, for example an option to make a transfer of funds and an option to make a B-pay payment.

At box 114 the user receives the menu message and replies by selecting the balance inquiry option. At box 116 the secure web-server 4 verifies the user using the CLI and sends an appropriate response for example a query as to which of the user's accounts the balance inquiry should be in respect of. At box 118 the user selects the account to be queried. At box 120 secure web-server 4 once again verifies the user on the basis of the cell phone's CLI. An encrypted SMS message confirming that the requested balance is to be made available is sent back to the user along with a request that the user to enter his/her PIN. At box 122 the user receives the encrypted message and the request for PIN. The user enters the PIN into cell phone 6 and sends the PIN and the encrypted message back to the web server. At box 124 the server verifies the user using the cell phone's CLI and PIN and returned encrypted message. Once verified a non-encrypted message stating the account balance for the account in question is sent back to the user's cell phone 6 for display on the cell phone at box 125.

Figure 9:
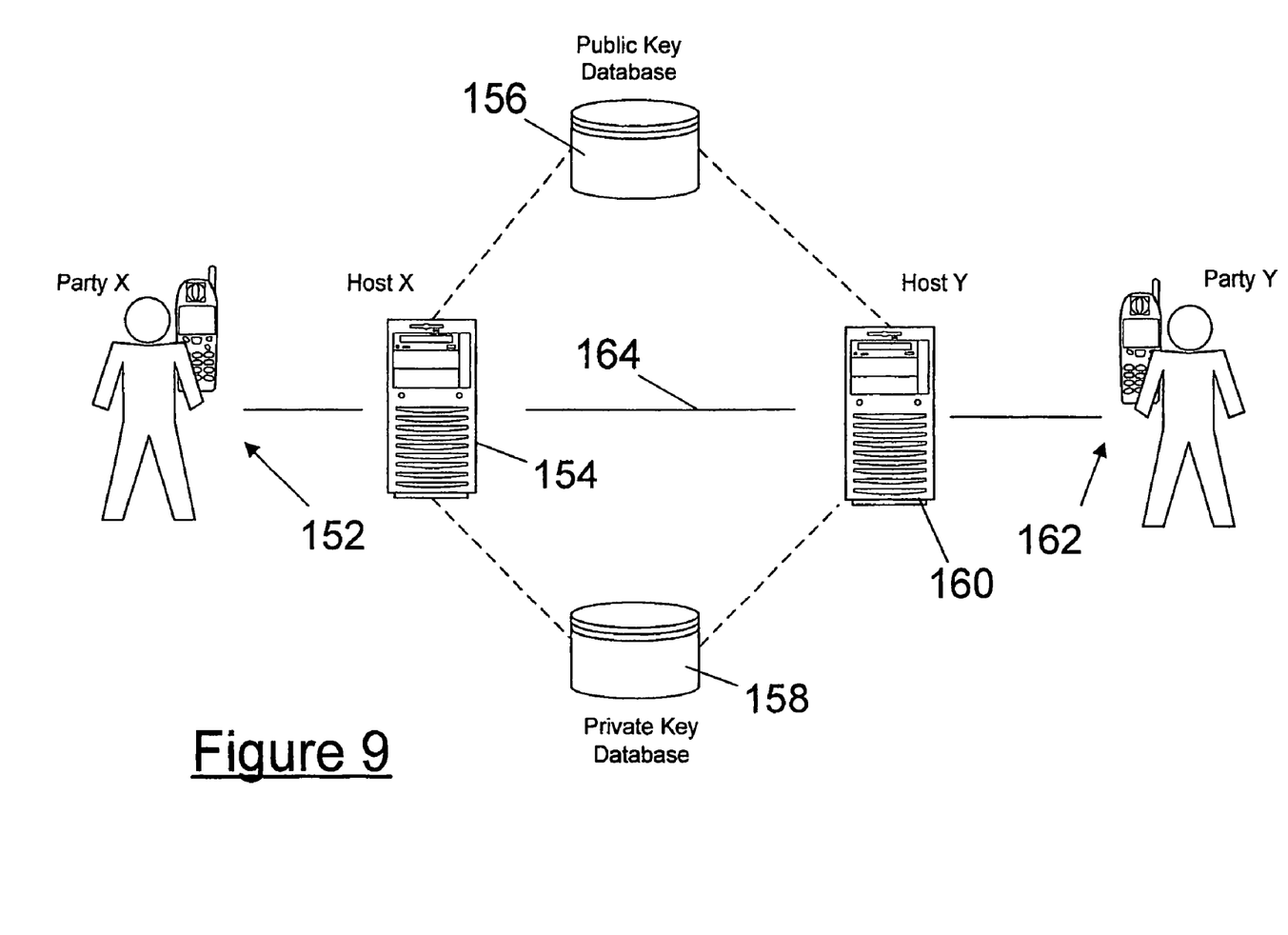
FIG. 9 depicts the parties involved in a transaction according to a further embodiment of the present invention.

A further embodiment of the present invention will now be described with reference to an example depicted in FIG. 9. In FIG. 9 a party X 152, instructs his bank's server, host X 154, to transfer funds to party Y's account, where host Y is a server of party Y's bank.

Figure 10:
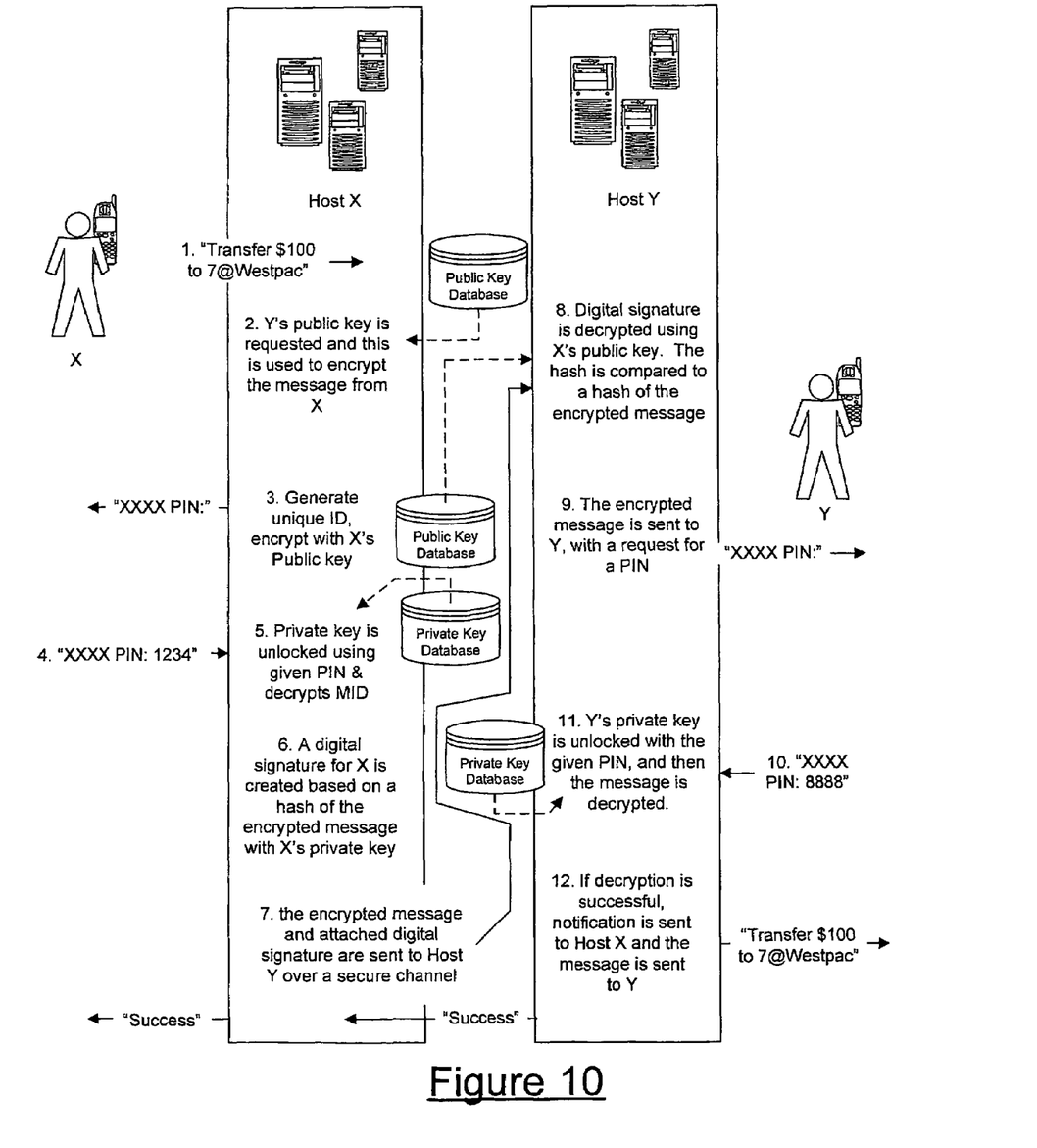
FIG. 10 depicts the steps involved in a transaction according to a further embodiment of the present invention.

The steps in the exemplary method are illustrated in FIG. 10 and are as follows:

1. Party X sends a message to host Y for forwarding to Party Y. For example the message might be "Transfer $100 to Party Y's account at Some Bank." In this scenario party X intends to transfer funds to an account of Party Y's at Some Bank.
2. Host X then requests the public key of party Y from a local or an external repository 156, (the repository could be a database in Host Y) and then encrypts the message from party X.
3. Host X then generates a unique random message ID (MID), encrypts this ID with party X's public key, and sends it back to party X.
4. Party X replies with his PIN. This verifies that X's PIN has not been compromised, assuming he is still in possession of his SIM.
5. Host X unlocks party X's private key (asynchronous keys) with the given PIN, and then decrypts the MID with the private key. If the MID does not match the one stored on Host X, then the transaction is logged as fraudulent.
6. Host X again uses party X's private key (still temporarily unlocked), this time to encrypt a one-way hash of the encrypted message created in Step 2. this is the equivalent of a digital signature—proving that party X was the originator of the message. This signature is appended to the encrypted message from Step 2.
7. The encrypted message and digital signature are sent to Host Y over a secure trusted channel 164. For example the message may be sent in HTTPS format or it could be by dedicated (wired) links to a private telecommunications network or virtual private network over Internet.
8. Upon Host Y receiving an encrypted message from Host X, it requests the public key of Party X from the public key database 156 and decrypts the digital signature. The encrypted message is then hashed and the two hashes are compared. The comparison is performed to verify the originator of the message (party X) and to ensure that the message has not been tampered with.
9. The encrypted section of the message (i.e. the message from Party X that has been encrypted with Y's public key) is sent to Y along with a note of the source of the message X.
10. Party Y then returns the message, with his private PIN.
11. Party Y's private key is unlocked with the given PIN, and the message is then decrypted.
12. If the message is decrypted successfully, it is sent to Y, and notification is sent to Host X, which in turn informs Party X of the successful decryptions.

It will be realised that from party Y's perspective the above-described transaction method provides a number of advantages.

Confidentiality—because the message is encrypted with party Y's public key, only party Y can decrypt the message, using his private key.

Authentication—successful decryption of the message using party X's public key implies it could only have been encrypted in the first place using party X's private key.

Data Integrity—party Y may be confident that the message from party X had not been tampered with en-route.

Non-repudiation—party X cannot subsequently deny having sent neither the message, nor dispute message content for the following reasons. Firstly, any entity could have encrypted a message with party Y's public key for transmission to Y, but that entity would not have access to party X's private key with which to encrypt the hash.

Secondly, the hash is unique to a particular message—allegedly different content would have produced hashed output different to that received and successfully decrypted.

From party X's perspective the transaction method provides a number of advantages as follows:

Confidentiality—message encrypted with party Y's public key can only be decrypted using party Y's private key.

Authentication—encrypted message could only have been decrypted using party Y's private key.

Data Integrity—party X may be confident that his message to Y has not been tampered with en-route.

Non-repudiation—party Y cannot subsequently deny having received the message for the following reasons: Firstly, only party Y could have decrypted the main message segment using party Y's private key before applying hashing to derive the hash for reconciliation. Secondly, the hash is unique to a particular message—allegedly different content would have caused the reconciliation to fail.

In the scenario of FIGS. 9 and 10, private keys are stored in an encrypted form, i.e. a synchronous form, on the server. The only way to access such keys is to unlock them with a key supplied by the end user. It will be readily apparent that the method may be readily extended to allow users to host their own private keys on their phones or other devices.

Methods according to embodiments of the present invention may be readily adapted to other financial transactions between a remote cell phone user and a server of a financial institution. For example the system may also be used to make credit card payments. Furthermore, encrypted messages may be sent inside multi-media messaging service (MMS) pictures. For example, the message may be embedded inside an image according to steganography techniques. In this way, an image of a person can be used to verify an identity, while at the same time, embedded content in the image can be used to transmit information. That is, the originator of the message is both visually and electronically identified.

Although the present invention has been described in terms of preferred embodiments, it is not intended that the invention be limited to these embodiments. Equivalent methods, structures, arrangements, processes, steps and other modifications apparent to those skilled in the art will fall within the scope of the following claims.

I claim:

1. A method for facilitating the secure transfer of a message between a first computational device and a second computational device, the steps comprising:

encrypting an initial message existing within the first computational device to create an encrypted message on the basis of a key derived from one or more codes associated with the second computational device;

transmitting the encrypted message to the second computational device;

purging the initial message within the first computational device;

purging the encrypted message from the first computational device;

inputting one or more codes into the second computational device based upon the encrypted message;

transmitting one or more codes and the encrypted message to the first computational device;

decrypting the message by the first computational device on the basis of the one or more codes sent from the second computational device; and transmitting the decrypted message to the second computational device.

2. A method according to claim 1, wherein the first computational device comprises a computer network server in communication with a cellular telephone network.

3. A method according to claim 1, wherein the initial message originates at a content sender in the form of a personal computer connected to the first computational device by means of a network.

4. A method according to claim 3, wherein the network is an Internet.

5. A method according to claim 1, wherein, the first computational device may comprises a cellular phone or a wireless personal digital assistant.

6. A method according to claim 1, wherein the second computational device comprises a cellular phone.

7. A method according to claim 6, wherein the step of encrypting an initial message involves forming the key based upon a cellular phone number and a personal identification number to be used by an owner of the cellular phone.

8. A method according to claim 7, wherein the step of transmitting the encrypted message to the cellular phone included transmitting a message identifier that is associated with the encrypted message.

9. A method according to claim 8, wherein the cellular phone transmits both the encrypted message and the message identifier back to the first computational means.

10. A method according to claim 8, further including the step of a first computational device generating an error code if the message identifier is not received back from the cellular phone within a predetermined time period.

11. A method according to claim 7 wherein the one or more codes include a PIN and CLI associated with the cellular phone.

12. A method according to claim 11, where in the first computational means checks the PIN and CLI for consistency in length and/or field type.

13. A method according to claim 1, further including a step of sending an error status message to a content sender advising of any error conditions.

14. A method according to claim 1 wherein two-way authentication between he first computational device and the second computational device is provided, the method further including a step of encrypting the message with a private key of the first computational means and a public key of the second computational means.

15. A method for secure data transfer, between a content sender and a receiver, the steps comprising:
   generating a data packet including a message from the content sender;
   transmitting the data packet to a security server;
   assigning a message identifier to the data packet received by the security server;
   storing the message identifier for the data packet in the security server;
   generating an encryption key for the message;
   encrypting the message using the encryption key created by the security server;
   generating a data package, wherein the data package includes the encrypted message and the message identifier;
   transmitting the data package to the receiver;
   purging the message and the encrypted message from the security server;
   entering a plurality of codes into the receiver in response to receipt of the data package;
   transmitting the encrypted message and the plurality of codes to the security server by the receiver;
   validating the plurality of codes transmitted within the security server;
   decrypting the encrypted message to form the message;
   transmitting the message to the receiver.

16. The method of claim 15, wherein the data packet includes a PIN number and a telephone number associated with the receiver.

17. The method of claim 15, wherein the data package further includes a text message which is displayed on the receiver as a request to enter a PIN number associated with the receiver.

18. The method of claim 15, wherein the security server includes a clock that records a time at which a message comprising the message identifier was transmitted to the receiver.

19. The method of claim 15, further comprising a step of generating a decryption key to decrypt the encrypted message after transmission of the plurality of codes from the receiver to the security server.

20. The method of claim 19, further comprising a step of generating a status message for transmission to the content sender after transmission of the decrypted message to the receiver.

* * * * *